United States Patent [19]

Keim et al.

[11] 4,281,264

[45] Jul. 28, 1981

[54] MOUNTING OF ARMATURE CONDUCTORS IN AIR-GAP ARMATURES

[75] Inventors: Thomas A. Keim, Clifton Park; Donald W. Jones, Burnt Hills, both of N.Y.

[73] Assignee: General Electric Company, Schenectady, N.Y.

[21] Appl. No.: 14,942

[22] Filed: Feb. 26, 1979

[51] Int. Cl.³ .............................................. H02K 3/48
[52] U.S. Cl. .................................. 310/194; 310/260; 310/270; 310/269
[58] Field of Search ............... 310/219, 215, 216, 199, 310/180, 269, 271, 270, 260

[56] References Cited

U.S. PATENT DOCUMENTS

| 896,323 | 8/1908 | Reist | 310/269 |
|---|---|---|---|
| 3,437,857 | 4/1969 | Seeliger et al. | 310/194 X |
| 4,068,142 | 1/1978 | Gillet et al. | 310/194 X |

Primary Examiner—Donovan F. Duggan
Attorney, Agent, or Firm—Charles E. Bruzga; James C. Davis, Jr.; Paul R. Webb, II

[57] ABSTRACT

In a dynamoelectric machine having armature conductors located in the air-gap separating rotor and stator, the conductors are secured to the stator structure. Conductor fastening means are provided which maintain the armature conductors and their support members in compression in all modes of operation of the machine.

14 Claims, 4 Drawing Figures

MOUNTING OF ARMATURE CONDUCTORS IN AIR-GAP ARMATURES

BACKGROUND OF THE INVENTION

The present invention relates to dynamoelectric machines, and more particularly, to such machines having armature conductors located in the air-gap. The instant invention is particularly drawn to a fastening technique to secure the armature conductors to the stator frame, under constant mechanical compression.

In certain dynamoelectric machines, the armature conductors are located within the air-gap separating the stator and the rotor, rather than in slots located between iron teeth. The electromechanical loads to which conductors are subjected within the air-gap are substantially greater than the loads applied to armature conductors located in the stator iron, since the magnetic field strength at the conductor is substantially greater in the former case. Furthermore, the electromechanical load direction rotates synchronously in the radial plane. If these forces were permitted to create relative motion between adjacent surfaces, fretting and abrading of the insulation layer on the conductors would result. Under abnormal operations, for example suddenly applied short circuits or synchronization out of phase, the electromagnetic forces on the conductors can be many times the normal operation forces for short periods of time. These forces can be of such a magnitude that damage to the relatively weak ground wall insulation on the conductors may result, unless the conductors are maintained in a state of compression. Electromagnetic design considerations dictate that the fraction of the air-gap volume devoted to conductor and insulation be as large as possible consistent with mechanical requirements of the conductor support structure. Consequently, an optimum support structure for armature conductors must provide secure mounting of the conductors without requiring massive structure.

In order to limit electrical losses within the armature conductor mounting structure, nonconductive structural materials are usually required for mounting the armature conductors. Fiber-reinforced plastics have been conventionally used because of their combination of strength and toughness in addition to being nonconductive. See, for example, U.S. Pat. No. 4,214,182 issued July 22, 1980 to Keim, and assigned to the instant assignee and incorporated herein by reference. However, plastics are not as readily fabricated to close tolerances as are metals. Also, plastics are subject to shrinkage, creep and relaxation to some extent.

Therefore, an armature conductor mounting structure must be able to compensate for small variations in size of the support members and for size changes over time without loss of firm support of the conductors.

Accordingly, an object of the invention is to provide a means to attach armature conductors to the stator of a dynamoelectric machine within the air-gap in such a way that the bars and their support means are held in compression in both the circumferential and radial directions.

A further object is to provide a mounting arrangement such that the compressive load applied to the armature conductors is maintained essentially constant regardless of minor changes or variations in the conductor support structure.

SUMMARY OF THE INVENTION

In a dynamoelectric machine having a stator and rotor separated by an air-gap in which armature conductors are to be secured, means are provided to fasten the armature conductors to the stator core in such a way that the conductors and the support means holding the conductors to the stator core are held in circumferential and radial compression throughout the operating range of the machine. According to the instant invention, a stator core having passages therein for accommodating tension bands is provided with appropriate frame structure. Mounting teeth are provided adjacent the radially-inner surface of the stator core, and armature conductors and spacers are placed between the teeth. Wedges and tensioning bands are placed in position to apply a compressive load to a pair of circumferentially-adjacent armature conductors. A tensile load is applied to the bands by spring members, and after assembly is completed, uniform spring loading is applied to each of the tensioning springs to provide a compression-loaded arch-bound structure holding the armature conductor bars to the stator core. In a preferred embodiment, wedges are inserted between pairs of conductors and drawn toward the stator core by tensioning means which pass through the stator core and are attached externally to the stator core by resilient tensioning means.

MANNER AND PROCESS OF MAKING AND USING THE INVENTION

Figure 1:
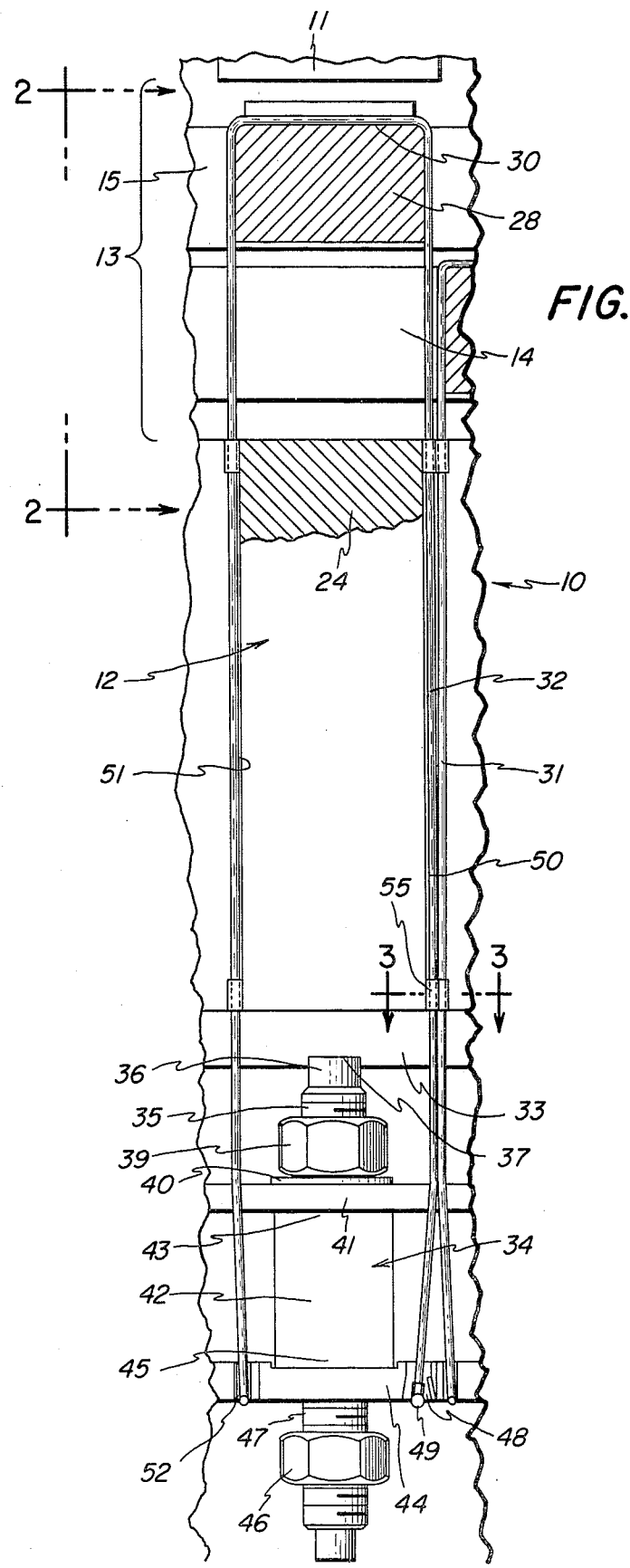
FIG. 1 is a schematic partial cross-sectional view of a stator core and conductor bar assembly incorporating the attachment means of the instant invention.
Figure 2:
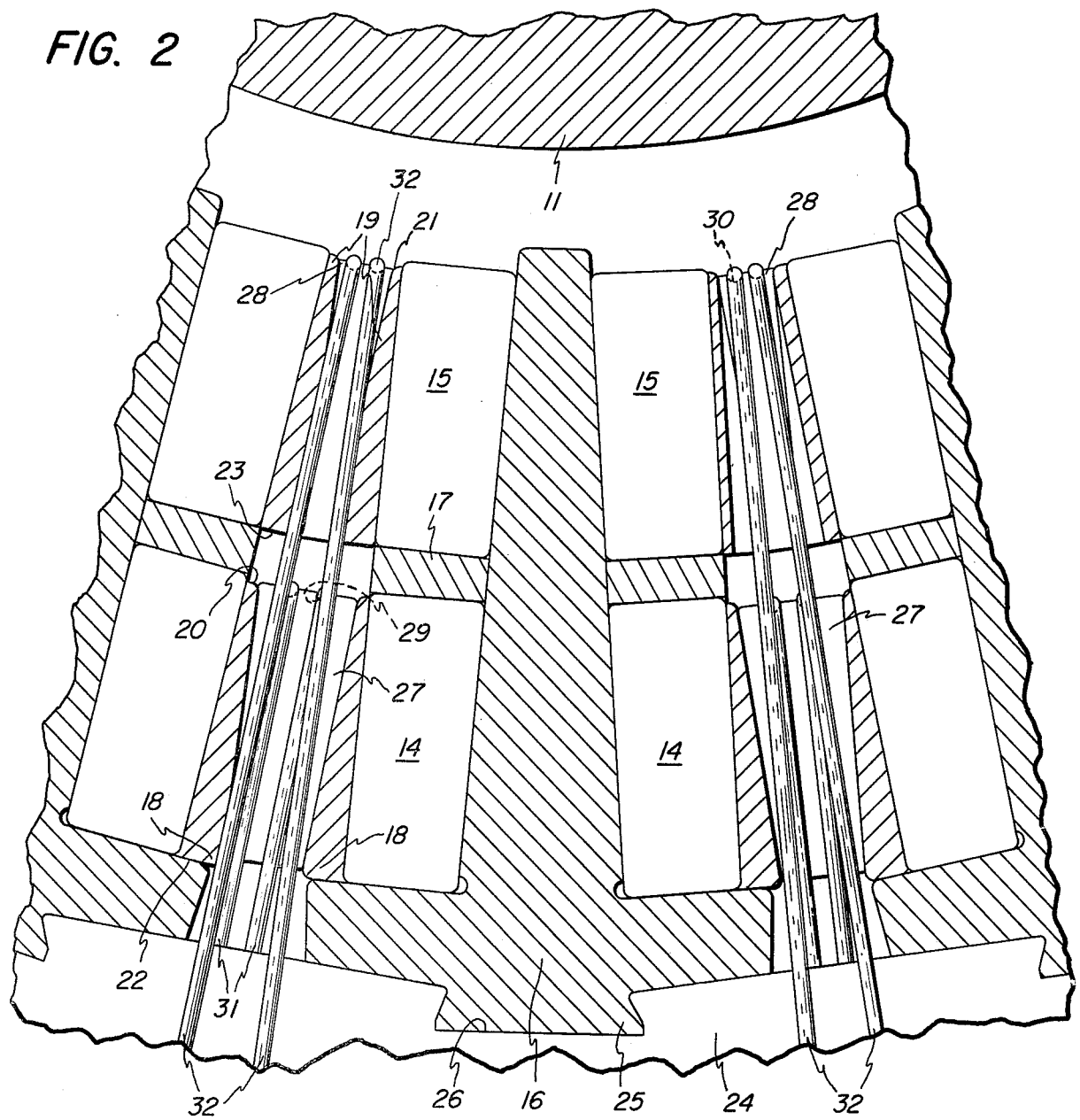
FIG. 2 is a schematic partial cross-sectional view taken along line 2—2 of FIG. 1.
Figure 3:
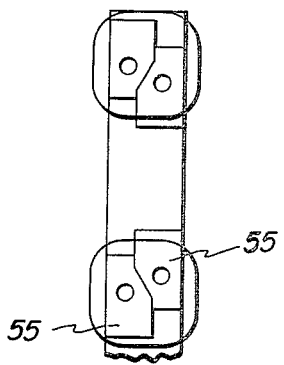
FIG. 3 is a cross-sectional view taken along line 3—3 of FIG. 1.

In FIG. 1 is shown one embodiment of the attachment structure 10 of the instant invention. The machine comprises a rotor 11 and a stator 12 separated by an air-gap 13 in which armature conductors 14 and 15 are mounted. As shown in FIG. 2, armature conductors 14, 15 are supported on mounting teeth 16 and separated by spacers 17. Teeth 16 are typically insulating teeth made of fiber reinforced plastics, and bound into stacks by an adhesive, such as epoxy. The stacks of teeth 16 are arranged in general axial alignment to support the generally axially-extending armature conductors. The spacers 17 are made of fiber reinforced plastic or other insulating materials. Attached to one side of each conductor 14, 15, respectively, is a wedge member 18, 19 of insulating material positioned so that the narrower end 20, 21, respectively, of each wedge is nearer the rotor 11 and the wider end 22, 23, respectively, is nearer the stator core 24. Conductors 14, 15 run the full axial length of the machine and wedge members 18, 19 may also run the full axial length of the machine or may be a plurality of separate, spaced wedge members affixed to one surface of conductors 14, 15. Teeth 16 have a dovetail projection 25 shaped to mate with a groove 26 in the stator iron core 24 to attach teeth 16 to the core 24 during assembly of the machine. Dovetails 25 and grooves 26 are used to facilitate assembly of the machine, but are not required for our invention. A non-interlocking surface on the stator core and teeth having a mating shape could be used, if it were preferred to use a temporary fastener for the mounting teeth during assembly.

Movable wedges 27, 28 are placed in mating contact with pairs of wedge members 18, 19, respectively, between pairs of conductors 14, 15, respectively. Wedges 27, 28 have grooves 29, 30, respectively, or other means to locate tensioning bands 31, 32, respectively, on the wedges 27, 28. As shown in FIG. 2, adequate support and loading can be provided by locating wedges 28 between every circumferentially adjacent pair of outer conductors 15 at one axial location, and in an axially-adjacent location locating wedges 27 between every circumferentially-adjacent pair of inner conductors 14. In this way, tensioning bands 32 do not need to overlap tensioning bands 31, and the attachment at the outer ends of these bands is simplified, since fewer fastening and loading devices are required. However, if desired, wedges 27, 28 may be inserted between each pair of wedge members 18, 19 to secure the conductors and the teeth to the stator core 24. In the arrangement shown in FIG. 1, tensioning bands 31, 32 extend through stator core 24 and pad member 33, which has an arcuate inner surface and bears on the outer surface of stator core 24. Tensioning device 34 hereinafter described serves to apply a constant load to tension band 32, and thereby to wedge 28. Although tensioning device 34 is shown herein transmitting its load to the outer surface of stator core 24 via member 33, it can just as well be supported on the stator frame to transmit its load thereto.

Tensioning device 34 comprises a generally radially-extending externally threaded pin 35 having one end 36 inserted into a blind hole 37 in frame 33. Nut 39 and washer 40 mounted on pin 35 position a bar 41 at a particular radial separation from member 33 and coil spring 42 surrounding pin 35 abuts bar 41 at one end 43 and a bar 44 at the opposite end 45. Bars 44 serve to retain and fasten the tensioning bands. Pin 35 extends through bar 44 and a nut 46 threaded on end 47 of pin 35 secures the parts of tensioning device 34 in a unit during assembly of the machine.

The ends of tension band 32 as shown in FIG. 1 are restrained in bushings 48 in bar 44. Each bushing 48 is socket-shaped to receive a ball-type fastener 49 so that tension band 32 may tilt to an angle to apply a uniform load on band 32. Band 32 extends from a first bushing 48 radially-inward through a passage 50 in core 24 over the end of wedge 28 (in groove 30) and then radially-outward through passages 51 in core 24 to bar 44, along a groove 52 in bar 44, back through bar 44 and core 24 and again over the end of wedge 28 (in another groove 30), through stator core 24 to another ball and socket connector within an insulating bushing in bar 44 adjacent the first bushing. Within the passages 50, 51 through stator core 24, spacers 55 as shown in FIG. 1 are located to maintain separation of adjacent tensioning bands.

Coil spring 42 is selected to have a spring force of the desired strength to apply the necessary force to the tensioning bands to maintain a compressive load in both the radial and circumferential directions on wedges 19 and armature conductors 15 in all modes of operation of the machine. By adjusting the position of nut 39 and washer 40, the position of the coil spring 42 and bar 44 may be adjusted so that expansion and small differences in length of the tensioning bands may be accommodated. The tension on band 32 may also be adjusted by moving nut 39.

Figure 4:
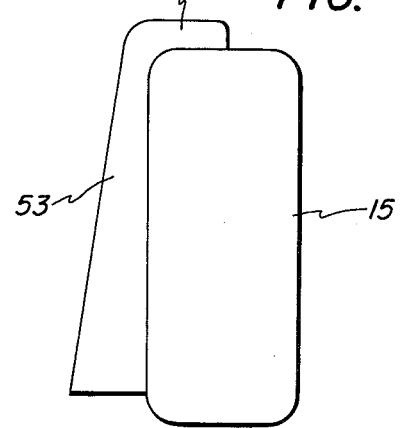
FIG. 4 is a schematic cross-sectional view illustrating an alternative embodiment of the wedge of the instant invention.

In FIG. 4 is shown an alternative form of the wedge for applying the compressive load to a conductor bar. The wedge member 53 has a cap 54 which extends over one end of the conductor bar 15 to apply a radially compressive load to the conductor bar. The interaction of wedge 53 with a loading wedge applies a circumferential compressive load on the conductive bar as in the embodiment illustrated in FIG. 2.

The tensioning bands may be continuous filament fiber reinforced plastic which has the favorable feature of being an insulator. However, metallic bands, especially nonmagnetic steel wire, are preferred because of its low stretching under tension and its limited susceptibility to shrinkage, creep and relaxation in long term use.

Although coil springs have been illustrated, other tensioning means such as hydraulic pistons, pneumatic pistons, coned disk springs or single or multiple leaf cantilevers could be used to tension the bands. The armature conductors may be formed of a plurality of stacked conductors and may be of rectangular shape (as shown) or nonrectangular shape. If the conductors are not rectangular, the conductors would be positioned to have a wider end radially-outward and an insulating layer would be applied to the conductor so that wedge members could be inserted to apply the compressive load. Each conductor could be provided with a cooling channel or cooling channels may be provided in each of a plurality of conductors making up each armature conductor.

By using the wedge tensioning members as shown, minor variations in manufacturing tolerance are readily accomodated at assembly, since the tensioning wedges would enter further between adjacent conductors if the conductors or the fixed wedges were of slightly less than ideal design width and would enter to a lesser extent if either or both were of slightly greater than ideal design width. Larger variations in wedge shape can be compensated by placing shims between wedges 27, 28 and wedge members 18, 19, respectively. Further, minor variation in length of tension bands can be accommodated by adjusting the position of the springs.

The tensioning method described herein applies a compressive pre-load larger than the electromechanical loads encountered in service during normal operation of the machine. When a load is applied to the conductors, the arch-bound structure maintained in compression distributes the stress due to a locally applied load, resulting in lower deflection of a member than would occur if the same load were applied to a single member, and thereby eliminating wear due to relative sliding between adjacent members.

The instant invention allows use of conductors coated with limited strength insulation without risking damage to the insulating covering.

The teeth supporting the conductor bars may be arranged as separate stacks of teeth with spaces between adjacent stacks as disclosed in U.S. Pat. No. 4,214,182, referenced above, which discloses a structure for accommodating thermal expansion in the axial direction. Such an arrangement may be used in our invention, or an alternative arrangement of support teeth may be used to position the armature conductors in the air gap. The instant application provides for maintaining the armature conductors in compression in all modes of operation regardless of thermal expansion and other loads which might be applied to the armature conductors, and allows use of support teeth structures of any type, so long as separation of the conductors is provided.

BEST MODE

The best mode contemplated for our invention uses rectangular conductors with wedge-shaped blocks of insulation attached to one surface thereof and insulating spacers between radially-adjacent conductors and driving wedges of insulating material mating with the wedge-shaped blocks with tensioning bands of nonmagnetic steel wire attached to a tensioning bar with a coil spring applying the radially-outward force thereto. Further, our best mode contemplates utilizing electrically nonconducting support teeth of fiber reinforced plastic having a dovetail section at the base thereof to facilitate assembly in the machine prior to the connection of the tensioning bands. The teeth are arranged in axially-spaced stacks and support pairs of radially-adjacent conductors separated by insulating spacers.

We claim:

1. In a dynamoelectric machine having a stator core, a rotor rotatable relative to said core about a longitudinal axis of said core and separaed from said core by an air-gap, and a plurality of circumferentially-spaced armature conductors located in said air-gap, the improvement comprising means for securing said armature conductors in said air-gap under continuous radial and circumferential compression, said armature conductors securing means comprising in combination, electrically nonconductive conductor-engaging means, conductor retaining means in contact with said conductor-engaging means, and resilient means for applying a radially-outwardly directed force to said conductor-retaining means, said conductor retaining means means transmitting force from said resilient means to said armature conductors through said conductor-engaging means.

2. The machine of claim 1 wherein said resilient means is affixed radially outside the stator core and each of said conductor retaining means extends from adjacent an armature conductor through said stator core to a location radially outside said core.

3. The machine of claim 2 wherein said means for securing said armature conductors further comprises electrically nonconductive armature conductor mounting means for positioning said armature conductors in said air-gap.

4. The machine of claim 3 wherein said nonconductive armature conductor mounting means comprises a plurality of stacks of fiber reinforced plastic teeth arranged in general axial alignment.

5. The machine of claim 2 wherein each of said resilient means comprises a coil spring assembly affixed at one end on a support member adjacent said stator core and at the other end to said retaining means.

6. The machine of claim 5 wherein said retaining means comprises a plurality of flexible strands, a moveable electrically nonconductive wedge, a first stationary wedge affixed to one of said armature conductors and a second stationary wedge affixed to an armature conductor circumferentially-adjacent said one of said armature conductors, each strand being fastened to one of said resilient means and passing through openings in said stator core and transmitting force from said resilient means to said movable wedge, each such moveable wedge engaging on one side thereof said first stationary wedge and on the other side thereof said second stationary wedge.

7. The machine of claim 6 further comprising electrically insulating teeth mounted in circumferentially-adjacent, axially extending stacks around the radially-interior surface of said stator core; and wherein said armature conductors comprise a plurality of circumferentially-spaced conductors located in said air-gap in radially-adjacent pairs, said pairs being radially separated by electrically insulating spacers, and said pairs being mounted on said insulating teeth in concentric rings.

8. The machine of claim 7 wherein a first plurality of said movable wedges, said first and second stationary wedges, said teeth, said circumferenially spaced conductors, said flexible strands and said coil spring means is located around the circumference of said stator core at one location along said longitudinal axis to provide a continuous ring of radially-inner armature conductors, teeth, stationary wedges and movable wedges held in continuous radial and circumferential compression; and at a location longitudinally-adjacent said one location a second plurality of said movable wedges, said first and second stationary wedges, said teeth, said circumferentially spaced conductors, said flexible strands and said coil spring means is located around the circumference of said stator core to provide a continuous ring of radially-outer armature conductors, teeth, stationary wedges and movable wedges held in continuous radial and circumferential compression.

9. The machine of claim 6 wherein said flexible strands comprise fiber reinforced plastic bands.

10. The machine of claim 6 wherein said flexible strands comprise nonmagnetic steel wires.

11. The machine of claim 2 wherein said conductor-engaging means comprises a plurality of movable nonconducting wedge means and a plurality of stationary wedge members affixed to said conductors.

12. The machine of claim 11 wherein said each of said stationary wedge members comprises a wedge-shaped body and a cap member extending generally perpendicularly to said body, so that when attached to a rectangular armature conductor and contacted by one of said movable wedges said cap engages a radially-inner edge of one of said conductors to apply said radially-outwardly directed force thereto.

13. The machine of claim 6 wherein the ends of said flexible strands are self-aligning at their points of attachment to said resilient means.

14. The machine of claim 8 further comprising a plurality of said inner continuous rings and wherein a plurality of said outer continuous rings are located alternately and coaxially along said longitudinal axis.

* * * * *